United States Patent
Koizumi et al.

(10) Patent No.: US 11,480,497 B2
(45) Date of Patent: Oct. 25, 2022

(54) ANOMALOUS SOUND DETECTION TRAINING APPARATUS, ACOUSTIC FEATURE EXTRACTION APPARATUS, ANOMALOUS SOUND SAMPLING APPARATUS, AND METHODS AND PROGRAMS FOR THE SAME

(71) Applicant: NIPPON TELEGRAPH AND TELEPHONE CORPORATION, Chiyoda-ku (JP)

(72) Inventors: Yuma Koizumi, Musashino (JP); Shoichiro Saito, Musashino (JP); Hisashi Uematsu, Musashino (JP); Kenta Niwa, Musashino (JP); Hiroaki Ito, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 387 days.

(21) Appl. No.: 16/089,214

(22) PCT Filed: Mar. 31, 2017

(86) PCT No.: PCT/JP2017/013738
§ 371 (c)(1),
(2) Date: Sep. 27, 2018

(87) PCT Pub. No.: WO2017/171051
PCT Pub. Date: Oct. 5, 2017

(65) Prior Publication Data
US 2019/0120719 A1  Apr. 25, 2019

(30) Foreign Application Priority Data

Apr. 1, 2016 (JP) ............... JP2016-074401
Jan. 16, 2017 (JP) ............... JP2017-004933

(51) Int. Cl.
*G01M 13/028* (2019.01)
*G05B 19/4065* (2006.01)
(Continued)

(52) U.S. Cl.
CPC .......... *G01M 13/028* (2013.01); *G01H 17/00* (2013.01); *G01M 99/00* (2013.01);
(Continued)

(58) Field of Classification Search
CPC ..... G01M 13/028; G01H 17/00; G01N 29/12; G01N 29/44; G05B 19/4065;
(Continued)

(56) References Cited

U.S. PATENT DOCUMENTS

2006/0171625 A1* 8/2006 Jones ............... G01M 13/045
384/624
2014/0046878 A1* 2/2014 Lecomte ............. G06K 9/6223
706/12
(Continued)

FOREIGN PATENT DOCUMENTS

| JP | 8-271573 A | 10/1996 |
|---|---|---|
| JP | 2012-181280 A | 9/2012 |
| JP | 5767825 B2 | 8/2015 |

OTHER PUBLICATIONS

Combined Chinese Office Action and Search Report dated Mar. 25, 2020 in Chinese Patent Application No. 201780020698 5 (with English translation), citing document AO therein, 24 pages.
(Continued)

*Primary Examiner* — Tarun Sinha
*Assistant Examiner* — Yossef Korang-Beheshti
(74) *Attorney, Agent, or Firm* — Oblon, McClelland, Maier & Neustadt, L.L.P.

(57) ABSTRACT

An anomalous sound detection training apparatus includes: a first acoustic feature extraction unit that extracts an acous-
(Continued)

tic feature of normal sound based on training data for normal sound by using an acoustic feature extractor; a normal sound model updating unit that updates a normal sound model by using the acoustic feature extracted; a second acoustic feature extraction unit that extracts an acoustic feature of anomalous sound based on simulated anomalous sound and extracts the acoustic feature of normal sound based on the training data for normal sound by using the acoustic feature extractor; and an acoustic feature extractor updating unit that updates the acoustic feature extractor by using the acoustic feature of anomalous sound and the acoustic feature of normal sound that have been extracted, in which processing by the units is repeatedly performed.

12 Claims, 9 Drawing Sheets

(51) Int. Cl.

| | |
|---|---|
| *G06N 3/08* | (2006.01) |
| *G01H 17/00* | (2006.01) |
| *G01M 99/00* | (2011.01) |
| *G10L 15/10* | (2006.01) |
| *G01N 29/12* | (2006.01) |
| *G01N 29/44* | (2006.01) |
| *G06N 99/00* | (2019.01) |
| *G10L 25/48* | (2013.01) |

(52) U.S. Cl.
CPC ............ *G01N 29/12* (2013.01); *G01N 29/44* (2013.01); *G05B 19/4065* (2013.01); *G06N 3/088* (2013.01); *G06N 99/00* (2013.01); *G10L 15/10* (2013.01); *G10L 25/48* (2013.01); *G05B 2219/37337* (2013.01)

(58) Field of Classification Search
CPC ......... G05B 2219/37337; G06N 3/088; G06N 99/00; G06N 20/00; G10L 15/10; G10L 25/48; B29C 2945/76471; G06F 17/14
See application file for complete search history.

(56) References Cited

U.S. PATENT DOCUMENTS

| | | | | |
|---|---|---|---|---|
| 2014/0311245 | A1* | 10/2014 | Horoshenkov | .... G01N 29/4427 73/592 |
| 2014/0328487 | A1* | 11/2014 | Hiroe | .................. G10L 21/0272 381/56 |
| 2015/0241584 | A1* | 8/2015 | Aarre | ....................... G01V 1/36 367/7 |

OTHER PUBLICATIONS

Extended European Search Report dated Mar. 10, 2020 in European Patent Application No. 17775582.4, 10 pages.
Office Action dated Aug. 20, 2019 in corresponding Japanese Patent Application No. 2018-509685 (with English Translation), 8 pages.
Partial Supplementary European Search Report dated Nov. 22, 2019, in Patent Application No. 17775582.4, citing documents AX-AY therein, 13 pages.
Bonfigli, R. et al., "A Real-Time Implementation of an Acoustic Novelty Detector on the BeagleBoard-XM", 2014 6th European Embedded Design In Education and Research Conference, XP032661946, Sep. 11, 2014, pp. 307-311.
Ntalampiras, S. et al., "Probabilistic Novelty Detection for Acoustic Surveillance Under Real-World Conditions", IEEE Transactions on Multimedia, XP011330160, vol. 13, No. 4, Aug. 1, 2011, pp. 713-719.
Tara N. Sainath, et al., "Learning filter banks within a deep neural network framework", ASRU 2013 IEEE Workshop, Jan. 2014, pp. 297-302.
Luke Pfister, et al., "Learning sparsifying filter banks", SPIE Proceedings, Wavelets and Sparsity XVI, vol. 9597, Aug. 2015, 11 pages.
Alain Biem, et al., "An application of discriminative feature extraction to filter-bank-based speech recognition", IEEE transactions on speech an audio processing, vol. 9, No. 2, Feb. 2001, pp. 96-110.
Ide, et al., "Anomaly Detection and Change Detection", Kodansha, Aug. 2015, pp. 6-7 and cover pages (with partial English language translation).
Sadanori Konishi, "Introduction to Multivariate Analysis, Appendix C: EM algorithm", Iwanami Shoten, Jan. 2010, pp. 294-298 and cover pages (with partial English language translation).
Hideki Asoh, et al., "Deep Learning", The Japanese Society for Artificial Intelligence, Kindai kagaku sha, Oct. 2015, p. 145 and cover pages (with partial English language translation).

* cited by examiner

ANOMALOUS SOUND DETECTION TRAINING APPARATUS, ACOUSTIC FEATURE EXTRACTION APPARATUS, ANOMALOUS SOUND SAMPLING APPARATUS, AND METHODS AND PROGRAMS FOR THE SAME

TECHNICAL FIELD

This invention relates to techniques for detecting anomalous sound of a machine from sound signals. For instance, it relates to techniques for generating an acoustic feature extractor for anomalous sound detection.

BACKGROUND ART

In a factory or the like, even a shutdown of an industrial device installed therein, such as a large-sized manufacturing or molding machine, due to a failure significantly hinders the factory's operation. It is thus necessary to routinely monitor the operational status of the device and immediately take measures in the event of an anomaly. One solution is to regularly dispatch a maintenance person to the field from an industrial device management service to check machine components for wear and the like. Since this requires enormous personnel and/or traveling costs and labor, however, it is difficult to implement this on all industrial devices and/or factories.

A solution to this is to install a microphone inside a machine so as to routinely monitor the operational sound of the machine. Through analysis of the operational sound, any occurrence of sound that is likely to be an anomaly (i.e., anomalous sound) is detected and an alert is raised, thereby solving the anomaly. However, setting the types of anomalous sound and/or methods for detecting them for every machine type or individual unit is even more expensive than manual monitoring. Thus, there is a need for automated design of rules for automatically detecting anomalous sound.

As a way to address this problem, anomalous sound detection based on statistical approaches is well known (see Non-patent Literature 1, for instance). Anomalous sound detection based on statistical approaches is generally classified into supervised anomalous sound detection and unsupervised anomalous sound detection. In supervised anomalous sound detection, a classifier is trained from training data for normal sound and anomalous sound; whereas in unsupervised anomalous sound detection, a classifier is trained only from training data for normal sound. For an industrial application, unsupervised anomalous sound detection is often used because training data for anomalous sound is difficult to collect.

A training/detection flow for unsupervised anomalous sound detection is as shown in FIG. 9. During training, an acoustic feature obtained from sound data (training data) at the time of normal operation is extracted. Thereafter, a normal sound model (a probability density function) is trained from the acoustic feature. Then, during determination, an acoustic feature is extracted in relation to a newly obtained observation, and a negative logarithmic likelihood (i.e., degree of anomaly) is evaluated against an already trained normal sound model. If the value is smaller than a threshold, it is determined to be normal; and if the value is larger than the threshold, it is determined to be anomalous. In other words, this is evaluation of how well an observed sound fits the normal sound model. It is based on the idea that sound "resembling" training data for normal sound should be produced if the observation represents normal sound and sound "not resembling" the training data for normal sound should be produced if the observation represents anomalous.

A challenge in unsupervised anomaly detection is design of an acoustic feature extractor $F(\cdot)$. In supervised anomalous sound detection, an acoustic feature that can correctly identify a target of determination is manually designed. For example, if it is known that the normal sound is a sinusoidal wave of 1000 Hz and the anomalous sound is a sinusoidal wave of 2000 Hz, a log power of a Mel filter bank (log-MFBO) is extracted per frame because the two sounds have different tone timbres. If the normal sound is steady engine noise and the anomalous sound is a "bumping" sound emitted by hitting of devices, a temporal difference of the power of a Mel filter bank ($\Delta$MFBO) is extracted because the anomalous sound is a sporadic sound. "Deep training", a type of supervised training, is said to be able to automatically design an acoustic feature from training data.

PRIOR ART LITERATURE

Non-Patent Literature

Non-patent Literature 1: Tsuyoshi Ide and Masashi Sugiyama, "Anomaly Detection and Change Detection", Kodansha, pp. 6-7, 2015.

SUMMARY OF THE INVENTION

Problems to be Solved by the Invention

In unsupervised anomaly detection, however, it cannot be known anomalous sound with what kind of sound characteristics will occur. It is accordingly difficult to manually design the acoustic feature extractor and the use of deep training is also difficult. For example, if the anomalous sound is assumed to be a sinusoidal wave of 2000 Hz and log-MFBO is used as the acoustic feature due to the fact that the normal sound was a sinusoidal wave of 1000 Hz, anomalous sound like a "bumping" sound emitted by hitting of devices cannot be detected. The opposite is also true. This has forced use of, for example, Mel filter bank cepstrum coefficient (MFCC), which is a general-purpose acoustic feature, resulting in low accuracy of detection compared to supervised training.

An object of the present invention is to provide an anomalous sound detection training apparatus that is capable of generating an acoustic feature extractor for anomalous sound detection irrespective of whether training data for anomalous sound is available or not, as well as an acoustic feature extraction apparatus, an anomalous sound sampling apparatus, methods, and programs associated with the anomalous sound detection training apparatus.

Means to Solve the Problems

An anomalous sound detection training apparatus according to an aspect of this invention includes: a first acoustic feature extraction unit that extracts an acoustic feature of normal sound based on training data for normal sound by using an acoustic feature extractor; a normal sound model updating unit that updates a normal sound model by using the acoustic feature extracted by the first acoustic feature extraction unit; a second acoustic feature extraction unit that extracts an acoustic feature of anomalous sound based on simulated anomalous sound and extracts an acoustic feature of normal sound based on the training data for normal sound by using the acoustic feature extractor; and an acoustic feature extractor updating unit that updates the acoustic feature extractor by using the acoustic feature of anomalous sound and the acoustic feature of normal sound that have been extracted by the second acoustic feature extraction unit. Processing by the first acoustic feature extraction unit, the normal sound model updating unit, the second acoustic feature extraction unit, and the acoustic feature extractor updating unit is repeatedly performed.

An anomalous sound detection training apparatus according to an aspect of this invention includes: a first acoustic feature extraction unit that extracts an acoustic feature of normal sound based on training data for normal sound by using an acoustic feature extractor; a normal sound model updating unit that updates a normal sound model by using the acoustic feature extracted by the first acoustic feature extraction unit; a second acoustic feature extraction unit that extracts an acoustic feature of anomalous sound based on training data for anomalous sound and extracts an acoustic feature of normal sound based on the training data for normal sound by using the acoustic feature extractor; and an acoustic feature extractor updating unit that updates the acoustic feature extractor by using the acoustic feature of anomalous sound and the acoustic feature of normal sound that have been extracted by the second acoustic feature extraction unit. Processing by the first acoustic feature extraction unit, the normal sound model updating unit, the second acoustic feature extraction unit, and the acoustic feature extractor updating unit is repeatedly performed.

Effects of the Invention

It is possible to generate an acoustic feature extractor for anomalous sound detection irrespective of whether training data for anomalous sound is available or not.

DETAILED DESCRIPTION OF THE EMBODIMENTS

[Overview of the Invention]
[[Structure of the Invention]]

Figure 5:
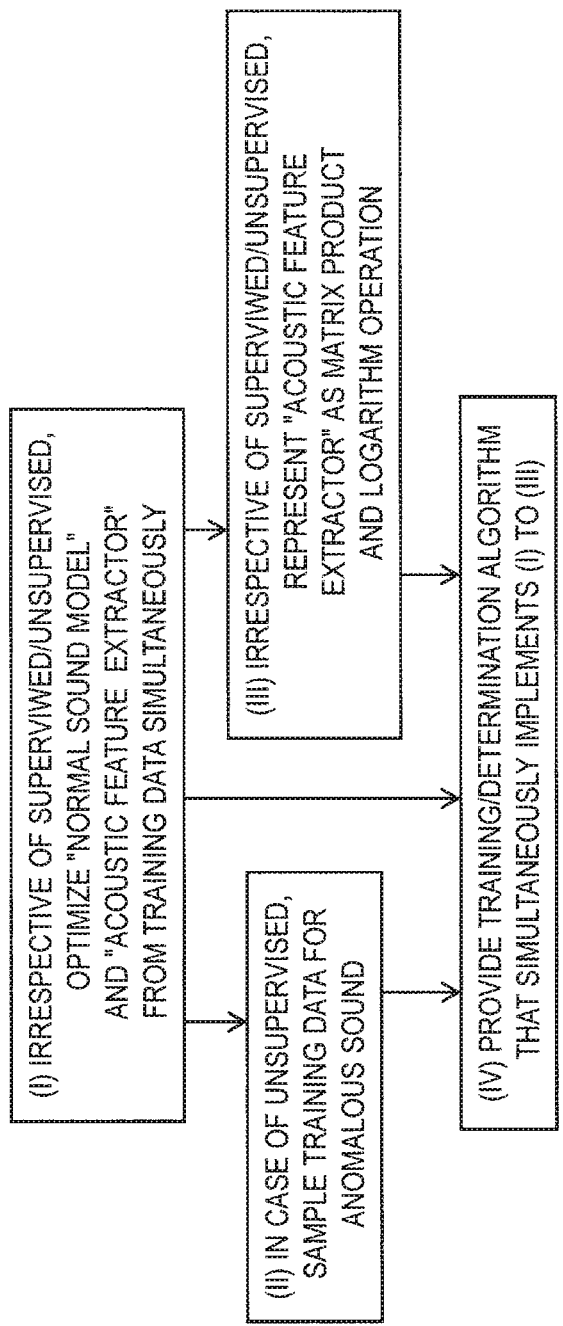
FIG. 5 is a diagram for describing an example of the structure of the present invention.

A hierarchical structure of the present invention is shown in FIG. 5.

(I) Irrespective of supervised/unsupervised, a "normal sound model" and an "acoustic feature extractor" are optimized simultaneously from training data.

(II) In the case of unsupervised, training data for anomalous sound is sampled.

(III) Irrespective of supervised/unsupervised, the "acoustic feature extractor" is represented as a matrix product and a logarithm operation, or as a multilayer perceptron, for example.

(IV) A training/detection algorithm that simultaneously implements (I) to (III) is provided.

The following will describe (I) to (III). Note that for the sake of description, they will be described in the order of (III), (I), (II). It will be followed by description on [Anomalous sound detection training apparatus and method] for performing them.

[[(III) Definition of Acoustic Feature Extractor]]

A series derived by Fourier-transformation of an observation signal and extraction of a power spectrum or amplitude spectrum is expressed as $X_{\omega,t} \in R_+^{\Omega \times T}$. Here, $\omega=\{1, 2, \ldots, \Omega\}$ and $t=\{1, 2, \ldots, T\}$ represent indices of frequency and time, respectively, $\Omega$ represents the number of frequency bins, and T represents the number of observed frames. $R_+$ represents a set of non-negative real numbers.

Most cases of acoustic feature extraction can be represented as a matrix operation on this series with a logarithmic function. For example, log-MFBO can be described as spectrum $X_t=(X_{1,t}, \ldots, X_{\Omega,t})^T$ of all frequencies in a certain frame multiplied by M Mel filter banks mm, of which the log is then taken.

$$F(M, X_t) = \begin{bmatrix} \ln(\max(m_1^T X_t, \varepsilon)) \\ \vdots \\ \ln(\max(m_M^T X_t, \varepsilon)) \end{bmatrix} = \ln(\max(MX_t, \varepsilon)) \quad (1)$$

Here, T represents transposition. Also, when ΔMFBO is defined as the temporal difference of Mel filter bank's output, it can be described as follows using a difference matrix D.

$$F(M, D, X_t) = \ln\left(\max\left(D\begin{bmatrix} MX_{t-1} \\ MX_t \end{bmatrix}, \varepsilon\right)\right), D = \begin{bmatrix} -E_M \\ E_M \end{bmatrix}^T \quad (2)$$

Here, $E_M$ is a unit matrix of M dimensions.

Figure 6:
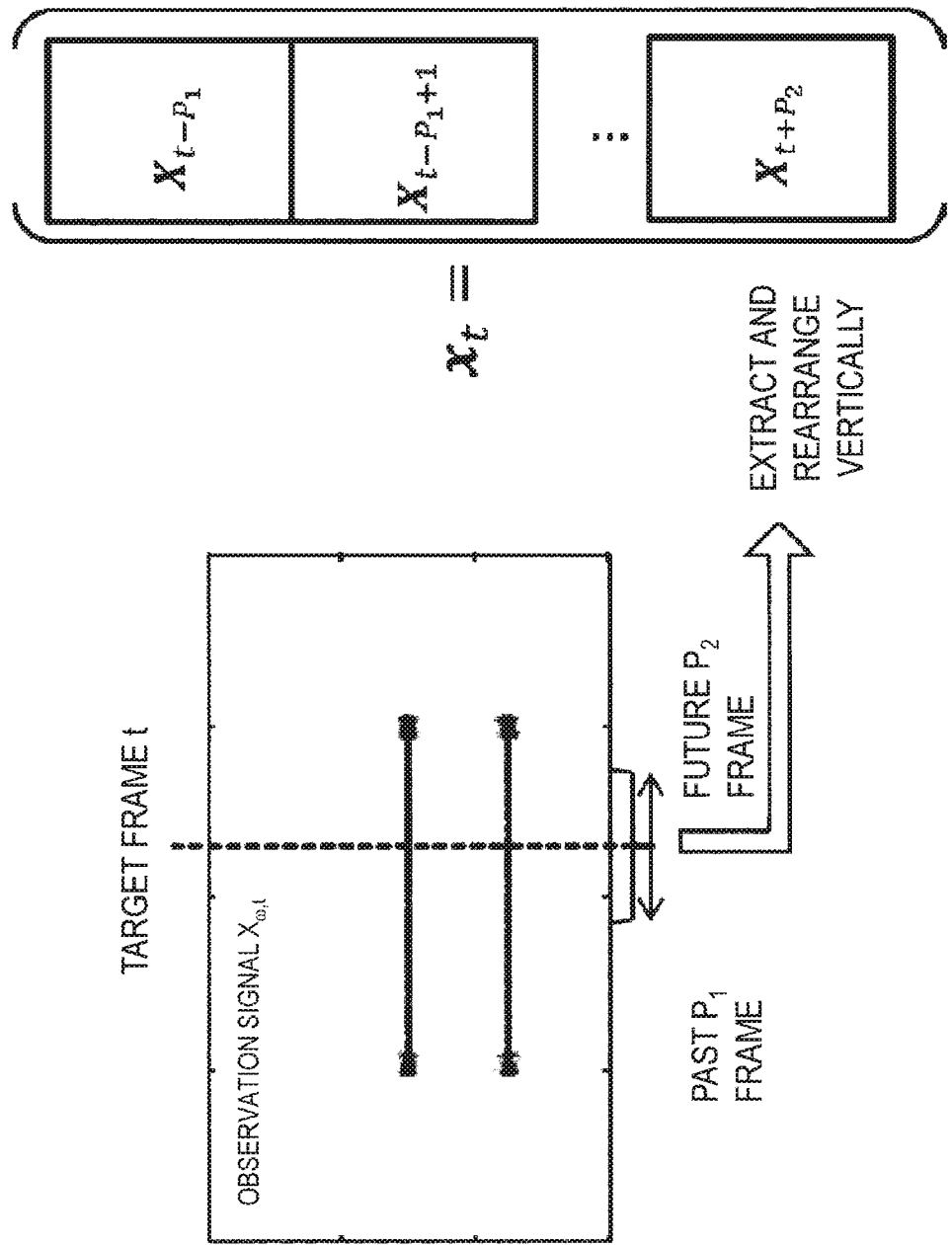
FIG. 6 is a diagram for describing an example of an acoustic feature function.

Herein, an acoustic feature extractor is defined with extension of this concept. First, past $P_1$ frame through future $P_2$ frame are taken from determination target frame t, and a vertical connection of them is defined as $x_t$, where $x_t$ is represented as shown in FIG. 6 and the formula below.

$$x_t = (\underbrace{X_{1,t-P_1}, \ldots, X_{\Omega,t-P_1}}_{X_{t-P_1}}, \underbrace{X_{1,t-P_1+1}, \ldots, X_{\Omega,t-P_1+1}}_{X_{t-P_1+1}}, \ldots, \underbrace{X_{1,t+P_2}, \ldots, X_{\Omega,t+P_2}}_{X_{t+P_2}})^T \quad (1')$$

$$= (x_{t,1}, \ldots, x_{t,Q})^T \in R_+^Q$$

Here, $Q=\Omega\times(P_1+P_2+1)$ holds. The modification to the first to second lines of formula (1') is rewriting for the purpose of simplifying the notation; the contents and order of the elements are unchanged. An operation that multiplies $x_t$ by a matrix $A \in R^{D \times Q}$ and takes the log thereof is defined as the acoustic feature extractor. That is, it will be as follows.

$$F(A, x_i) = \begin{bmatrix} f(a_1, x_i) \\ \vdots \\ f(a_D, x_i) \end{bmatrix} = \begin{bmatrix} \ln(\max(a_1^T x_i, \varepsilon)) \\ \vdots \\ \ln(\max(a_D^T x_i, \varepsilon)) \end{bmatrix} = \ln(\max(Ax_i, \varepsilon)) \quad (3)$$

$$A = \begin{bmatrix} a_{1,1} & \cdots & a_{1,Q} \\ \vdots & \ddots & \vdots \\ a_{D,1} & \cdots & a_{D,Q} \end{bmatrix} = \begin{bmatrix} a_1 \\ \vdots \\ a_D \end{bmatrix} \quad (4)$$

Thus, optimization of the acoustic feature extractor can be said to be optimization of matrix A.

[[(I) Simultaneous Optimization of Normal Sound Model and Acoustic Feature Extractor]]

First, a normal sound model (a probability density function followed by a feature amount extracted from normal sound) is defined as $p(F(A,x)|z=0)$. Then, a negative logarithmic likelihood (the degree of anomaly) can be computed as below.

$$g(A,x) = -\ln p(F(A,x)|z=0) \quad (5)$$

Here, although the normal sound model may be any of various types, when it is a Gaussian mixture distribution, for example, it can be described as:

$$p(F(A, x) | z = 0) = \quad (6)$$
$$\sum_{k=1}^{K} W_k \exp\left\{-\frac{1}{2}(F(A,x)-\mu_k)^T \sum_k^{-1}(F(A,x)-\mu_k)\right\}$$

$$W_k = \frac{w_k}{(2\pi)^{D/2}\sqrt{\det(\sum_k)}} \quad (7)$$

Here, K is the number of mixtures, and k, $\Sigma_k$, and $w_k$ are a mean vector, a covariance matrix, and a weight parameter for the kth distribution, respectively.

In anomalous sound detection, when the value of $g(A,x)$ is greater than threshold $\phi$, it is determined to be "anomalous"; when the value is smaller than threshold $\phi$, it is determined to be "normal". Although this determination can be described as a step function, for the simplicity of the subsequent calculations, it is described with a sigmoid function:

$$\sigma\{\alpha\} = \frac{1}{1+\exp(-\alpha)} \quad (8)$$

The sigmoid function $0 \leq \sigma\{\alpha\} \leq 1$ outputs a value closer to 0 as $\alpha$ is smaller and outputs a value closer to 1 as $\alpha$ is greater. That is, when $\sigma\{g(A,x-\phi)\}$ is equal to or greater than 0.5, it is determined to be anomalous; when it is equal to or smaller than 0.5, it is determined to be normal.

An aim of an anomalous sound detection algorithm is to output a great a $\{g(A,x-\phi)\}$ when the observation represents anomalous sound and to output a small $\sigma\{g(A,x-\phi)\}$ when it represents normal sound. That is, minimizing the following formula is the aim of optimization of anomalous sound detection.

$$L=-\int \sigma\{g(A,x)-\phi\}(p(F(A,x)|z=1)-p(F(A,x)|z=0))dx \quad (9)$$

Here, $p(F(A,x)|z=1)$ is an anomalous sound model (a probability density function followed by a feature amount extracted from anomalous sound).

From the foregoing, simultaneous optimization of the normal sound model and the acoustic feature extractor should be performed so as to simultaneously satisfy both:

$$p(F(A, x) | z = 0) = \underset{p(F(A,x)|z=0)}{\operatorname{argmin}} L \quad (10)$$

$$A = \underset{A}{\operatorname{argmin}} L \quad (11)$$

Optimization of the acoustic feature extraction can be said to be design of the matrix A such that formula (11) is optimized.

Optimization of formula (10) can be carried out with a maximum likelihood method, for example. Thus, consider the optimization of formula (11). The foremost challenge in calculating formula (9) is the integration operation. Thus, this integration is replaced with arithmetic mean of training data. First, an objective function is defined as:

$$L=-\int \sigma\{g(A,x)-\phi\}p(F(A,x)|z=1)dx+\int \sigma\{g(A,x)-\phi\}p(F(A,x)|z=0)dx \quad (12)$$

Each of the terms can then be regarded as an expectation operation for $\sigma\{G(A,x-\phi)\}$, thus they can be described as:

$$L=-E[\sigma\{g(A,x)-\phi\}]_{x|z=1}+E[\sigma\{g(A,x)-\phi\}]_{x|z=0} \quad (13)$$

Here, if $E[\cdot]_{x|z=0}$ is an expectation operation relating to normal sound, while $E[\cdot]_{x|z=1}$ is an expectation operation relating to anomalous sound.

Here, if replacing the expectation operations with arithmetic means, formula (11) can be approximated as follows:

$$A = \underset{A}{\operatorname{argmin}} -\frac{1}{N}\sum_{n=1}^{N}\sigma\{g(A,x_n)-\phi\}+\frac{1}{T}\sum_{t=1}^{T}\sigma\{g(A,x_t)-\phi\} \quad (14)$$

$$= \underset{A}{\operatorname{argmin}} \underbrace{-\frac{1}{N}\sum_{n=1}^{N}\Psi_n+\frac{1}{T}\sum_{t=1}^{T}\Psi_t}_{J} \quad (15)$$

Here, N is a time index of training data for anomalous sound. That is, the accuracy of anomalous sound detection will be maximized by calculating the arithmetic means of $\Psi_{1, \ldots, T}$ using training data for normal sound, calculating the arithmetic means of $\Psi_{1, \ldots, T}$ using training data for anomalous sound, and designing A so that the sum of the two arithmetic means is minimized. In the case of supervised anomalous sound detection where training data for anomalous sound has been obtained, this can be performed without modification. In the case of unsupervised anomalous sound detection, N pieces of anomalous sound data are sampled (simulated) in accordance with the sampling algorithm described below. In that case, N should be set about N=T.

Now that the objective function has been set with formula (15), it is then minimized. For the minimization, a gradient method may be used. When a steepest descent method is used as the gradient method, the matrix may be optimized for each dimension d as:

$$a_d \leftarrow a_d - \lambda \frac{\partial J}{\partial a_d} \qquad (16)$$

Here, $\lambda$ is step size. For this optimization, AdaGrad, that is, an improved algorithm of the steepest descent method, or the like may be used, of course.

In a case where the normal sound model is represented as a Gaussian mixture distribution, a gradient vector $\partial J/\partial a_d$ can be calculated follows using the chain rule of partial differentiation.

$$\frac{\partial J}{\partial a_d} = -\frac{1}{N}\sum_{n=1}^{N}\frac{\partial \Psi_n}{\partial g(A,x_n)}\frac{\partial g(A,x_n)}{\partial F(A,x_n)}\frac{\partial F(A,x_n)}{\partial a_d} + \qquad (17)$$

$$\frac{1}{T}\sum_{t=1}^{T}\frac{\partial \Psi_t}{\partial g(A,x_t)}\frac{\partial g(A,x_t)}{\partial F(A,x_t)}\frac{\partial F(A,x_t)}{\partial a_d}$$

Here, each of the components can be calculated by:

$$\frac{\partial \Psi_i}{\partial g(A,x_i)} = \sigma\{g(A,x_i)-\phi\}(1-\sigma\{g(A,x_i)-\phi\}) \qquad (18)$$

$$\frac{\partial g(A,x_i)}{\partial F(A,x_i)} = \sum_{k=1}^{K}\Gamma_{k,i}\{(F(A,x_i)-\mu_k)^T\Sigma_k^{-1}\} \qquad (19)$$

$$\Gamma_{k,i} = \frac{W_k\exp\left\{-\frac{1}{2}(F(A,x_i)-\mu_k)^T\Sigma_k^{-1}(F(A,x_i)-\mu_k)\right\}}{\sum_{j=1}^{K}W_j\exp\left\{-\frac{1}{2}(F(A,x_i)-\mu_j)^T\Sigma_j^{-1}(F(A,x_i)-\mu_j)\right\}} \qquad (20)$$

$$\frac{\partial F(A,x_i)}{\partial a_d} = \begin{bmatrix} \frac{\partial f(a_1,x_i)}{\partial a_{d,1}} & \cdots & \frac{\partial f(a_1,x_i)}{\partial a_{1,Q}} \\ \vdots & \ddots & \vdots \\ \frac{\partial f(a_D,x_i)}{\partial a_{d,1}} & \cdots & \frac{\partial f(a_D,x_i)}{\partial a_{1,Q}} \end{bmatrix} \qquad (21)$$

$$\frac{\partial f(a_j,x_i)}{\partial a_{d,q}} = \frac{C_{i,j,d,q}}{\max(a_j^T x_i, \varepsilon)} \qquad (22)$$

$$C_{i,j,d,q} = \begin{cases} x_{i,q}\delta(d,j) & (a_j^T x_i > \varepsilon) \\ 0 & (\text{otherwise}) \end{cases} \qquad (23)$$

$$\delta(d,j) = \begin{cases} 1 & d=j \\ 0 & (\text{otherwise}) \end{cases} \qquad (24)$$

[[(II) Sampling of Training Data for Anomalous Sound]]

For calculation of formula (15) in unsupervised anomalous sound detection, how training data for anomalous sound is sampled will be discussed.

The distribution used with anomalous sound model $p(F(A,x)|z=1)$ is arbitrary. In unsupervised training, no previous knowledge on anomalous sound has been obtained. In order to detect every kind of anomalous sound, it is desirable to construct an anomalous sound model with as least assumptions as possible. That is, it is desirable to sample anomalous sound only from generally known findings about the physical characteristics or frequency of appearance of an amplitude spectrum and/or power spectrum.

In the following, an anomalous sound model is constructed with assumptions made only for the occurrence frequency, sparsity, and continuity in temporal frequency direction of amplitude values.

Figure 7:
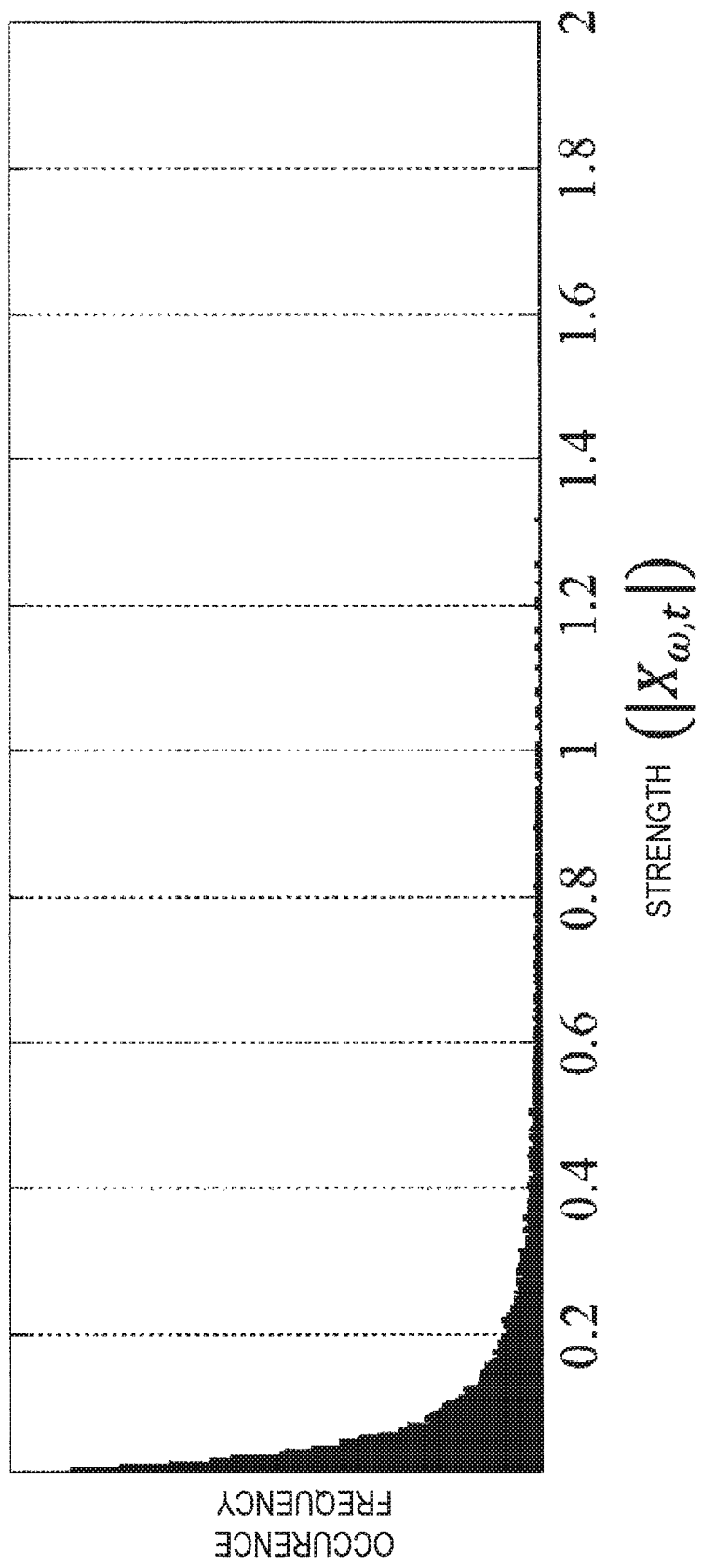
FIG. 7 shows an example of occurrence frequency distribution of an amplitude spectrum spectrum for a single sound signal.

First, consider the magnitude of $X_{\omega,n}$. FIG. 7 shows the occurrence frequency distribution of the amplitude spectrum for a single sound signal. The horizontal axis is strength and the vertical axis is the frequency of appearance. From FIG. 7, it can be seen that strengths around 0 are most likely to occur in the amplitude spectrum of a sound signal and the frequency of appearance exponentially decreases as the strength increases. $X_{\omega,n}$ should be sampled from a probability distribution that satisfies these characteristics.

A distribution that satisfies the characteristics is an exponential distribution, for example. An exponential distribution is a distribution such that:

$$p(o;\beta) = \frac{1}{\beta}\exp\left\{-\frac{o}{\beta}\right\} \qquad (25)$$

In the distribution, the frequency of appearance of o decreases as the value of o increases. $\beta$ is an average value. In the case of sampling $X_{\omega,n}$ from an exponential distribution, it will be as follows.

$$X_{\omega,n} \sim \frac{1}{\beta}\exp\left\{-\frac{1}{\beta}X_{\omega,n}\right\} \qquad (26)$$

Since $\beta$ is a parameter relating to the volume of observed sound, it can be set from the training data for normal sound. For example, it can be set as:

$$\beta = \frac{1}{\Omega T}\sum_{\omega=1}^{\Omega}\sum_{t=1}^{T}X_{\omega,t} \qquad (27)$$

If previous knowledge on stationary noise contained in observation signals or the like is available, this sampling may be modified as desired. For example, if an average spectrum $Y_\omega$ of stationary noise is known, sampling may be performed such that:

$$X_{\omega,n} = Y_\omega + E_{\omega,n} \qquad (28)$$

$$E_{\omega,n} \sim \frac{1}{\beta_\omega}\exp\left\{-\frac{1}{\beta_\omega}E_{\omega,n}\right\} \qquad (29)$$

$\beta$ here can be calculated by:

$$\beta_\omega = \sqrt{\frac{1}{T}\sum_{t=1}^{T}(\max(0, X_{\omega,t}-Y_\omega))^2} \qquad (30)$$

When sampled with formula (29), a volume average $\beta_\omega$ of anomalous sound will be constant independently of time. Depending on the distance to a microphone or the type of anomalous sound, the amplitude value, or the volume, might increase or decrease. Hence, it is desirable to vary the value of $\beta_{\omega,n}$ on a per-n basis. For representing this, formula (29) may be modified as follows, for example:

$$E_{\omega,n} \sim \frac{1}{\beta_{\omega,n}}\exp\left\{-\frac{1}{\beta_{\omega,n}}E_{\omega,n}\right\} \qquad (31)$$

-continued $$\beta_{\omega,n} = g_\omega \times b_\omega 10^{\theta/20} \quad (32)$$

$$g_\omega = \sqrt{\frac{1}{T}\sum_{t=1}^{T}(X_{\omega,t} - N_\omega)^2} \quad (33)$$

$$b_\omega \sim \text{Uniform}(0, 1) \quad (34)$$

Here, θ is a parameter in unit of dB for correcting the maximum volume of anomalous sound, and Uniform(a,b) is a continuous uniform distribution of maximum a and minimum b. For example, θ may be set to about 0 to 12. As another way, similar effects could be provided by sampling θ from a normal distribution or the like and setting it always to, for example, 1, without performing sampling of $b_\omega$.

Figure 8:
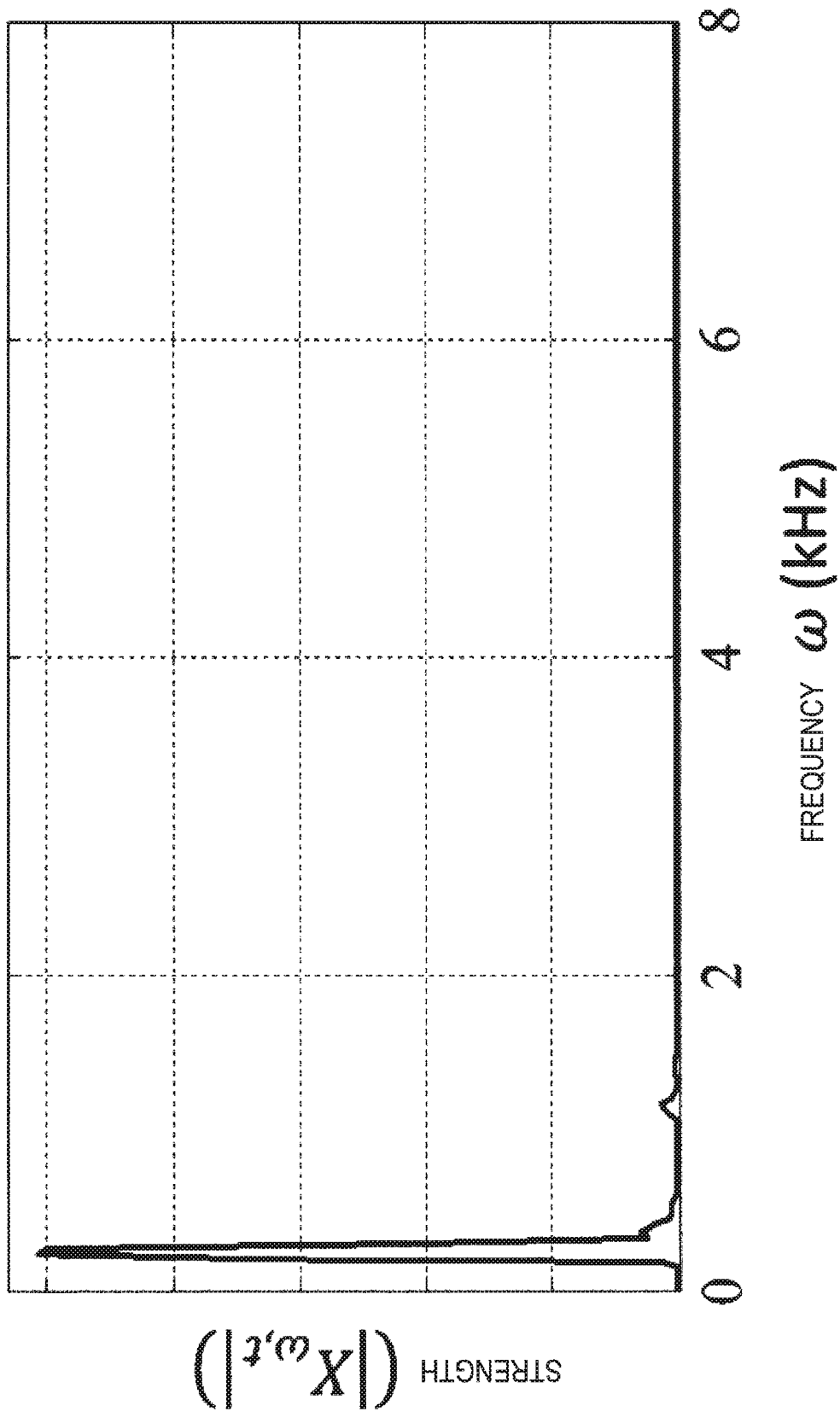
FIG. 8 shows an example of sparsity of an amplitude spectrum.
Figure 9:
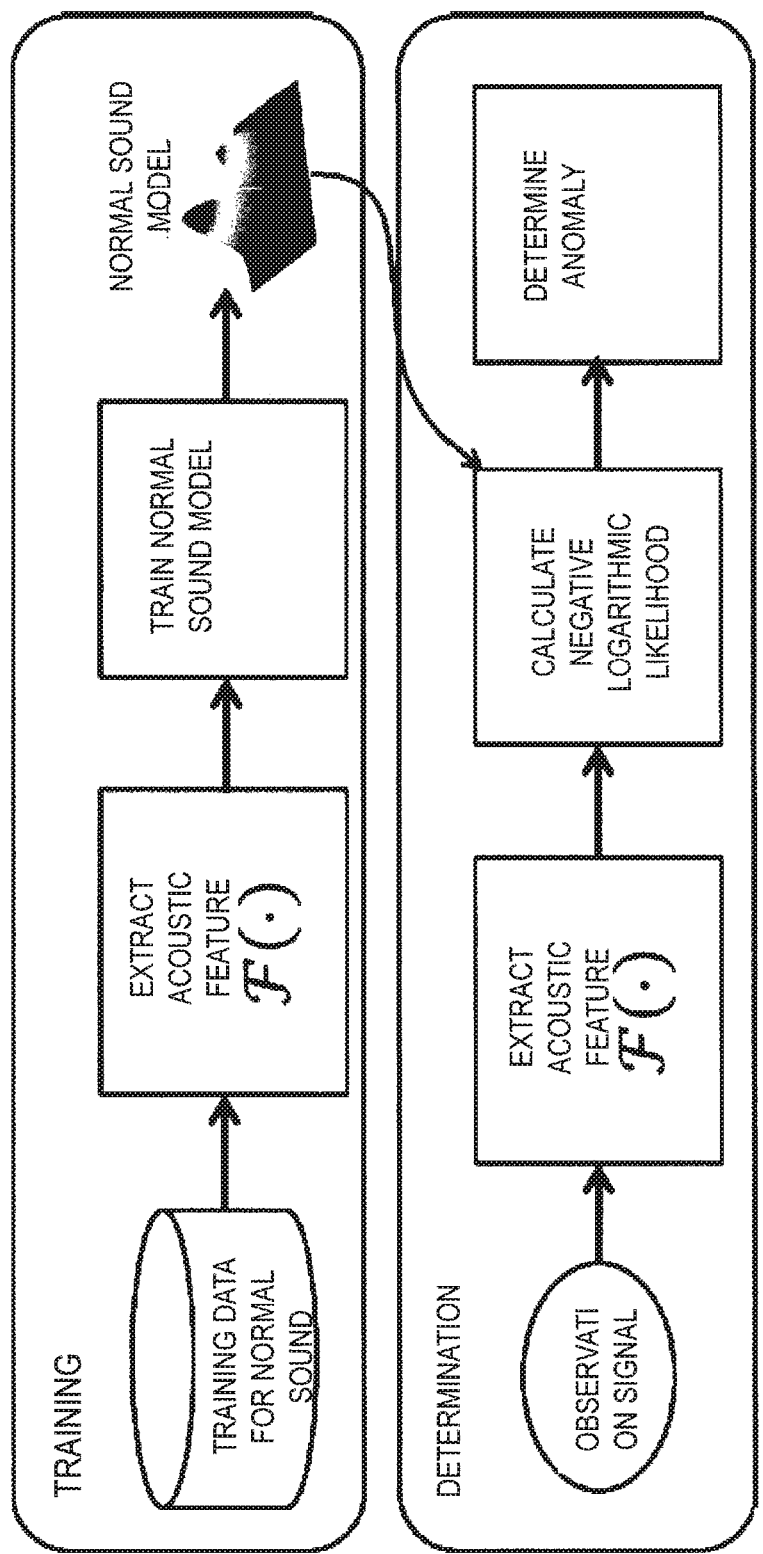
FIG. 9 is a diagram for describing a conventional technique.

It is also possible to focus on the sparsity of an amplitude spectrum (almost all of the elements being 0). FIG. 8 shows an example of plotting $X_{1, \ldots, \Omega, t}$ for a certain frame. FIG. 8 indicates that a sound signal often has only one or several frequency components in a single frame. Focusing on this, the sampling of formula (31) may be modified as follows:

$$E_{\omega,n} \sim \frac{1}{\beta_{\omega,n}}\exp\left\{-\frac{1}{\beta_{\omega,n}}E_{\omega,n}\right\} \quad (35)$$

$$\beta_{\omega,n} = \begin{cases} g_\omega & w = z_n \\ 0 & (\text{otherwise}) \end{cases} \quad (36)$$

$$z_n \sim \text{Cat}(1_\Omega/\Omega) \quad (37)$$

Here, Cat(π) is category distribution and $1_\Omega$ is a vector with a length of Ω whose elements are all 1. This makes only one spectrum bin become active at each time via $z_n$, thereby driving the anomalous sound spectrum E to be sparse.

Also, sampling with formula (35) results in generation of a value of $E_{\omega,n}$ that is completely independent from the temporal frequency direction. A sound signal typically changes smoothly in terms of time, so that the spectrum thereof smoothly changes in the temporal frequency direction. For achieving this, $F_{\omega,n}$ may be smoothed in the temporal frequency direction.

While the smoothing can be done in various ways, it can be performed using a Gaussian filter as follows, for example:

$$X_{\omega,n} = Y_\omega + \text{conv2}(E_{\omega,n}, G(F,T)) \quad (38)$$

Here, conv2 is a convolution operation of two dimensions, and G(F,T) is a two-dimensional Gaussian filter with a size of F×T. Although the parameters should be controlled experimentally, they may be set at about F=11 and T=31, for example.

[Anomalous Sound Detection Training Apparatus and Method]

Figure 1:
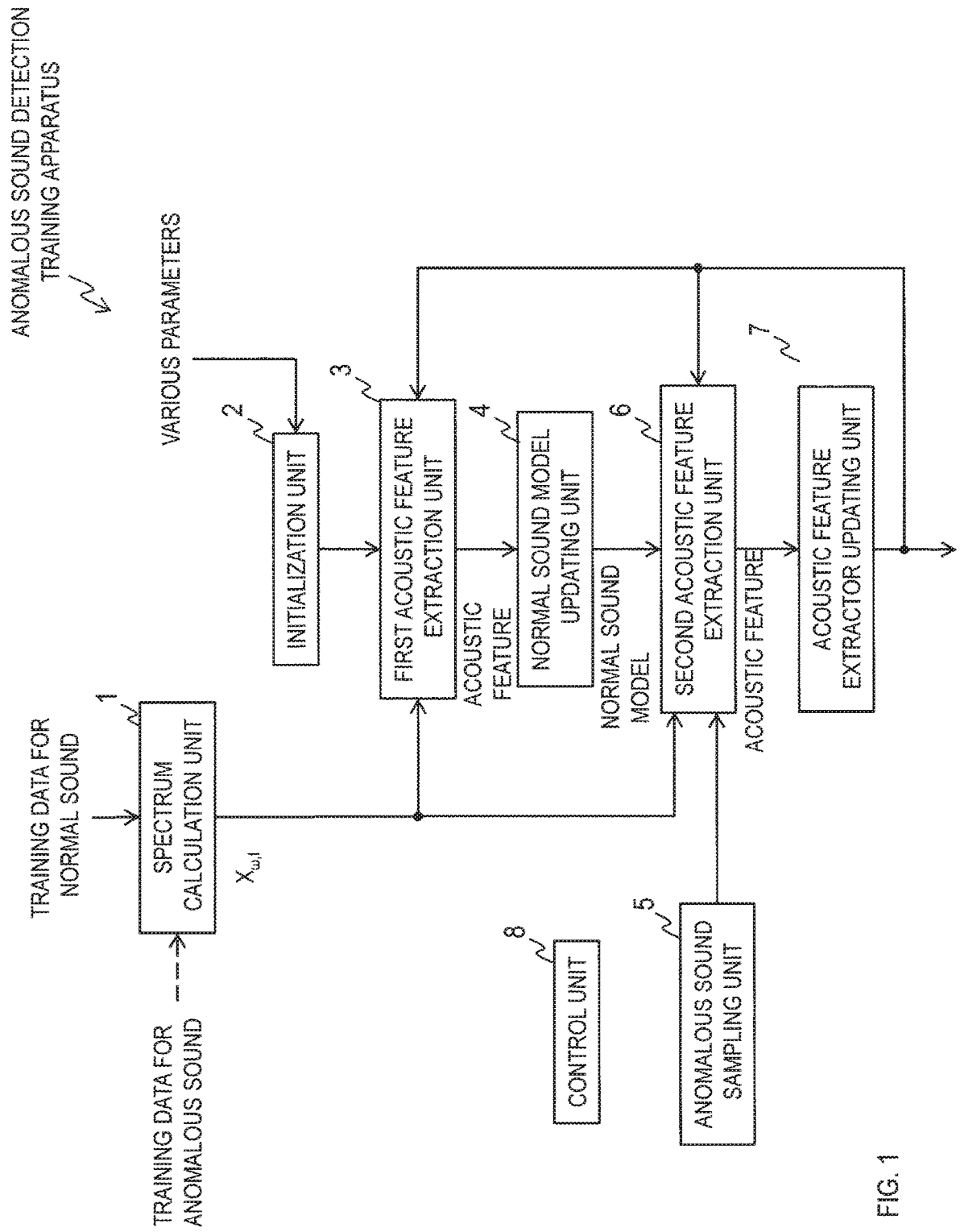
FIG. 1 is a block diagram for describing an example of an anomalous sound detection training apparatus.
Figure 2:
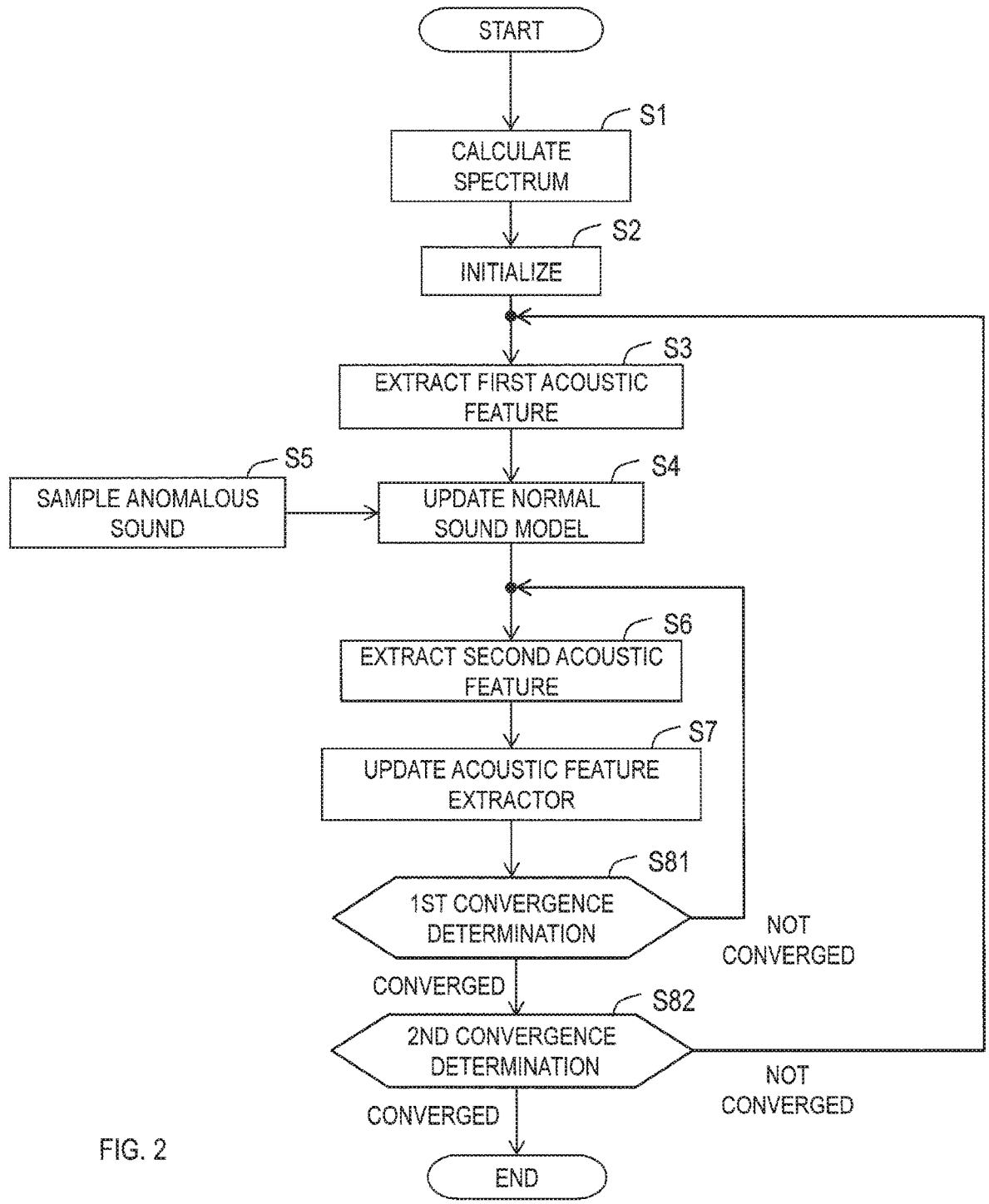
FIG. 2 is a flowchart for describing an example of an anomalous sound detection training method.

As exemplarily shown in FIG. 1, an anomalous sound detection training apparatus includes a spectrum calculation unit 1, an initialization unit 2, a first acoustic feature extraction unit 3, a normal sound model updating unit 4, an anomalous sound sampling unit 5, a second acoustic feature extraction unit 6, an acoustic feature extractor updating unit 7, and a control unit 8. An anomalous sound detection training method is implemented by the units of the anomalous sound detection training apparatus executing the processing at step S1 to S82 described in FIG. 2 and below.

<Spectrum Calculation Unit 1>

Training data for normal sound is input to the spectrum calculation unit 1.

The training data for normal sound is sound signals collected by a microphone installed near (or alternatively inside) a device for which anomalous sound is to be detected. While the sampling frequency for collecting sound signals should be set so that the frequencies of normal sound can be recorded, it may be set at 16 kHz, for example.

The spectrum calculation unit 1 converts the training data into a frequency domain via an approach such as short-time Fourier transformation (STFT).

It then takes an absolute value of a complex spectrum to determine an amplitude spectrum $X_{\omega,t}$ (step S1). Alternatively, $X_{\omega,t}$ may be a power spectrum derived by determining the square root of the amplitude spectrum. Here, Fourier transformation length may be set at 32 ms and shift width may be set at 16 ms, for example.

In the following, $X_{\omega,t}$ as either an amplitude spectrum or a power spectrum will be abbreviated as spectrum $X_{\omega,t}$. The spectrum $X_{\omega,t}$ is output to the first acoustic feature extraction unit 3 and the second acoustic feature extraction unit 6.

If training data for anomalous sound is available, namely in the case of supervised training, the spectrum calculation unit 1 calculates the spectrum of anomalous sound based on the training data for anomalous sound. The spectrum of anomalous sound is the amplitude spectrum or the power spectrum of the anomalous sound, for example. The calculated spectrum of anomalous sound is output to the first acoustic feature extraction unit 3 and the second acoustic feature extraction unit 6.

<Initialization Unit 2>

Preset parameters for a training algorithm and preset parameters for an acoustic feature extractor are input to the initialization unit 2.

The various parameters may be set such that $P_1=3$, $P_2=3$, $\varepsilon=\min(X_{\omega,t})/2$, $\phi=100$, and $\lambda=5.0\times10^{-3}$, for example.

The initialization unit 2 initializes the matrix A for the acoustic feature extractor and the normal sound model (step S2). After being initialized, the matrix A and the normal sound model are output to the first acoustic feature extraction unit 3.

The matrix A may be initialized with uniform random numbers, for example. While initialization of the normal sound model varies depending on the type of the probability density function, when a Gaussian mixture distribution is used, for example, the normal sound model can be initialized via a k-means algorithm or the like.

<First Acoustic Feature Extraction Unit 3>

To the first acoustic feature extraction unit 3, the acoustic feature function initialized by the initialization unit 2 and the training data for normal sound are input.

The first acoustic feature extraction unit 3 extracts an acoustic feature of normal sound based on the training data for normal sound by using the acoustic feature extractor (step S3). In this example, as the training data for normal sound, the first acoustic feature extraction unit 3 uses the spectrum $X_{\omega,t}$ calculated by the spectrum calculation unit 1 based on the training data for normal sound to extract the acoustic feature of normal sound. The extracted acoustic feature is output to the normal sound model updating unit 4.

A first round of processing by the first acoustic feature extraction unit 3 is performed by using the acoustic feature extractor initialized by the initialization unit 2. Second and subsequent rounds of processing by the first acoustic feature extraction unit 3 are performed by using the acoustic feature extractor as updated by the acoustic feature extractor updating unit 7.

If the spectrum of anomalous sound has been calculated by the spectrum calculation unit 1 based on training data for anomalous sound, the first acoustic feature extraction unit 3 extracts the acoustic feature of anomalous sound based on this calculated spectrum of anomalous sound by using the acoustic feature extractor.

<Normal Sound Model Updating Unit 4>

The normal sound model updating unit 4 updates the normal sound model by using the acoustic feature extracted by the first acoustic feature extraction unit 3 (step S4).

While the way of update varies depending on the type of the probability density function for the normal sound model, it may be updated by maximum likelihood estimation, for example. In a case where a Gaussian mixture distribution is used as the normal sound model, one to several steps of update may be performed in an EM algorithm (see Reference Literature 1, for instance).

[Reference Literature 1] Sadanori Konishi, "Introduction to Multivariate Analysis, Appendix C: EM algorithm", pp. 294-298, Iwanami Shoten, 2010.

<Anomalous Sound Sampling Unit 5>

The anomalous sound sampling unit 5 samples simulated anomalous sound (step S5). The sampled anomalous sound is output to the second acoustic feature extraction unit 6.

The anomalous sound sampling unit 5 performs sampling of simulated anomalous sound based on formula (26), for example. The parameter $\beta$ in formula (26) can be determined based on formula (27), for example. In this case, for $X_{\omega,t}$ in formula (27), the spectrum $X_{\omega,t}$ of normal sound calculated by the spectrum calculation unit 1 may be used.

If training data for anomalous sound is available, namely in the case of supervised training, sampling is not performed. That is, the subsequent processing may be performed using the training data for anomalous sound as the sampling result.

<Second Acoustic Feature Extraction Unit 6>

The second acoustic feature extraction unit 6 extracts the acoustic feature of anomalous sound based on simulated anomalous sound and extracts the acoustic feature of normal sound based on the training data for normal sound by using the acoustic feature extractor (step S6). The acoustic feature of anomalous sound and the acoustic feature of normal sound that have been extracted are output to the acoustic feature extractor updating unit 7.

In this example, as the training data for normal sound, the second acoustic feature extraction unit 6 uses the spectrum $X_{\omega,t}$ calculated by the spectrum calculation unit 1 based on the training data for normal sound to extract the acoustic feature of normal sound.

The first round of processing by the second acoustic feature extraction unit 6 is performed by using the acoustic feature extractor initialized by the initialization unit 2. The second and subsequent rounds of processing by the second acoustic feature extraction unit 6 are performed by using the acoustic feature extractor as updated by the acoustic feature extractor updating unit 7.

<Acoustic Feature Extractor Updating Unit 7>

The acoustic feature extractor updating unit 7 updates the acoustic feature extractor by using the acoustic feature of anomalous sound and the acoustic feature of normal sound that have been extracted by the second acoustic feature extraction unit 6 (step S7). The updated acoustic feature extractor is output to the first acoustic feature extraction unit 3 and the second acoustic feature extraction unit 6. Also, the acoustic feature extractor as finally updated after repeated control by the control unit 8 is output as a final result of training performed by the anomalous sound detection training apparatus and method.

The acoustic feature extractor updating unit 7 updates the acoustic feature extractor based on formula (16), for example. Prior to execution of this update, threshold $\phi$ may be updated according to the formula below using training data for normal sound $x_1, \ldots, x_T$ and sampled anomalous sound data $x_1, \ldots x_N$. This stabilizes convergence.

$$\phi = \frac{\text{median}(g(A, x_{1,\ldots,T})) + \text{median}(g(A, x_{1,\ldots,N}))}{2} \quad (39)$$

<Control Unit 8>

The control unit 8 performs control so as to repeatedly perform processing by the first acoustic feature extraction unit 3, the normal sound model updating unit 4, the second acoustic feature extraction unit 6, and the acoustic feature extractor updating unit 7 (steps S81 and S82). This repeated processing is performed until the acoustic feature extractor and the normal sound model converge.

For example, the control unit 8 performs control so as to repeatedly perform the processing by the second acoustic feature extraction unit 6 and the acoustic feature extractor updating unit 7 (hereinafter referred to as a first repeated processing). Setting a first convergence determination condition as that the number of executions of processing has reached a certain number of times (for example, 50) or that an update norm for the matrix A has fallen below a certain value, the control unit 8 performs control so as to repeatedly perform the first repeated processing until the first convergence condition is satisfied, or in other words, until it is determined that convergence has been reached. The first convergence determination condition may also be a different condition.

The control unit 8 subsequently performs control so as to repeatedly perform the processing by the first acoustic feature extraction unit 3 and the normal sound model updating unit 4 and the first repeated processing (hereinafter referred to as a second repeated processing). Setting a second convergence condition as that the number of executions of processing has reached a certain number of times (for example, 200), the control unit 8 performs control so as to repeatedly perform the second repeated processing until the second convergence condition is satisfied, or in other words, until it is determined that convergence has been reached. The second convergence determination condition may also be a different condition.

[Anomalous Sound Detection Apparatus and Method]

Figure 3:
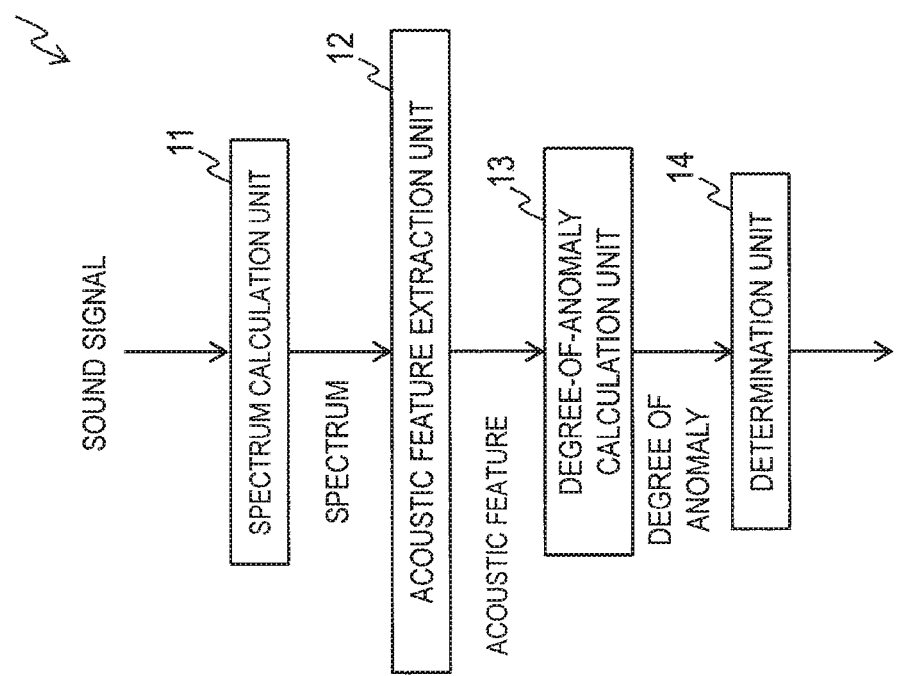
FIG. 3 is a block diagram for describing an example of an anomalous sound detection apparatus.
Figure 4:
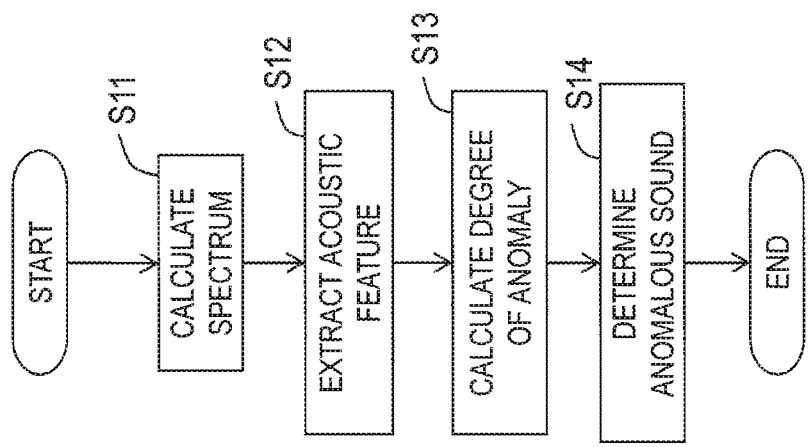
FIG. 4 is a flowchart for describing an example of an anomalous sound detection method.

As exemplarily shown in FIG. 3, an anomalous sound detection apparatus includes a spectrum calculation unit 11, an acoustic feature extraction unit 12, a degree-of-anomaly calculation unit 13, and a determination unit 14. An anomalous sound detection method is implemented by the units of the anomalous sound detection apparatus executing the processing at step S11 to S14 described in FIG. 4 and below.

<Spectrum Calculation Unit 11>

Operational sound of a machine for which anomalous sound is to be detected is collected through a microphone. The sampling rate used for this collection is similar to the one used for training. The collected sound signal is input to the spectrum calculation unit 11.

The spectrum calculation unit 11 obtains spectrum. $X_{\omega,t}$ based on the collected sound signal in a similar manner to the spectrum calculation unit 1 (step S11). The obtained spectrum $X_{\omega,t}$ is output to the acoustic feature extraction unit 12.

<Acoustic Feature Extraction Unit 12>

The acoustic feature extraction unit 12 uses the Obtained spectrum $X_{\omega,t}$ to extract the acoustic feature of the collected sound signal based on the acoustic feature extractor that has been output by the anomalous sound detection training apparatus and method as the final result of training (step S12). The extracted acoustic feature is output to the degree-of-anomaly calculation unit 13.

<Degree-of-Anomaly Calculation Unit 3>

The degree-of-anomaly calculation unit 13 calculates a negative logarithmic likelihood g(A,x) by using the extracted acoustic feature and a normal sound model that has been output by the anomalous sound detection training apparatus and method as the final result of training (step S13). Hereinafter, a negative logarithmic likelihood will be referred to as the degree of anomaly. The calculated degree of anomaly is output to the determination unit 14.

<Determination Unit 14>

The determination unit 14 outputs "anomalous" if the degree of anomaly of a current frame is equal to or greater than threshold $\phi$ (step S14). Although the threshold should be adjusted in accordance with the machine and/or environment in question, it may be set at about 1500, for example.

As with voice activity detection, "hangover", which suppresses detection errors with heuristic rules, may be used. While the hangover processing to be applied may be any of various types, the hangover processing should be set in accordance with the types of false detection of anomalous sound.

As an example, musical noise that occurs during noise suppression could be determined as a sporadic anomalous sound. Since sound like a sporadic hitting sound often exhibits change in spectrum shape for 100 ms or more, the degree of anomaly would remain equal to or greater than the threshold for $\lceil$(100/the frame shift width for STFT)$\rceil$ frames continuously. However, because in musical noise an anomalous amplitude spectrum value only occurs in the relevant frames, there would be several frames at most where the degree of anomaly remains equal to or greater than the threshold continuously. Thus, a rule for anomaly determination may be set as "outputting "anomalous" if the degree of anomaly remains equal to or greater than the threshold for $F_1$ frames or more continuously", for example.

As another example, it is also conceivable that anomalous sound continues for a long period of time with the degree of anomaly slightly below the threshold due to a low volume of the anomalous sound. In such a case, a rule like "detecting a sound as anomalous if a total sum of its degree of anomaly over the last $F_2$ frames is equal to or greater than $\phi_1$" may be added as a determination rule for continuous anomalous sound. Although $\phi_1$ should be determined by tuning, it may be set at about $\phi_1 = F_2 \times (\phi - 250)$, for example.

By detecting anomalous sound from a large-sized manufacturing or molding machine installed in a factory or the like using the anomalous sound detection apparatus and method as described above, faster handling of a failure and/or failure prediction become possible. This can contribute to increased efficiency of an industry, for example, manufacturing industry in particular.

[Program and Recording Medium]

In the case of implementing the processing in the anomalous sound detection training apparatus or the anomalous sound detection apparatus with a computer, the processing details of the functions to be provided by the anomalous sound detection training apparatus or the anomalous sound detection apparatus are described by a program. By the computer then executing the program, the processing is implemented on the computer.

The program describing the processing details may be recorded in a computer-readable recording medium. The computer-readable recording medium may be any kind of medium, for example, a magnetic recording device, an optical disk, a magneto-optical recording medium, and a semiconductor memory.

In addition, individual processing means may be embodied by execution of a predetermined program on a computer or at least some of their processing details may be implemented in hardware.

[Modifications]

Using the optimization metrics for acoustic feature described above, a multilayer perceptron can also be trained unsupervised. Specifically, although the acoustic feature extractor was described using formula (3), it may instead be implemented with a multilayer perceptron. For example, when a simplest fully-connected multilayer perceptron is used, the acoustic feature extractor would be as shown below. In this manner, the acoustic feature extractor may also be represented by a multilayer perceptron.

$$F(x_\tau) = W^{(L)} g_\tau^{(L-1)} + b^{(L)} \tag{40}$$

$$g_\tau^{(k)} = \sigma_\theta \{ W^{(k)} g_\tau^{(k-1)} + b^{(k)} \} \tag{41}$$

Here, L, (k), and b(k) represent the number of layers of a neural network, a weight matrix, and a bias vector, respectively. L is a predetermined positive integer equal to or greater than 2. $\sigma_\theta$ is an activation function and may be implemented as a sigmoid function, for example. Input to the input layer may be such that $g_\tau^{(1)} = x_\tau$ or $g_\tau^{(1)} = \ln x_\tau$, for example. $g_\tau^{(k)}$ is input to the kth layer of the multilayer perceptron. In this case, optimization of the acoustic feature extractor is optimization of $\Theta = \{(W(k), b(k)\}, (k \in \{2, \ldots, L\})$.

For this optimization, a gradient method may be used as in formula (16). If a steepest descent method is used as the gradient method, it may be done such that:

$$W^{(k)} \leftarrow W^{(k)} - \lambda \frac{\partial J}{\partial W^{(k)}} \tag{42}$$

$$b^{(k)} \leftarrow b^{(k)} - \lambda \frac{\partial J}{\partial b^{(k)}} \tag{43}$$

For this optimization, AdaGrad, that is, an improved algorithm of the steepest descent method, or the like may be used, of course. The objective function J is given by $$J = -\frac{1}{N} \sum_{n=1}^{N} \Psi_n + \frac{1}{T} \sum_{t=1}^{T} \Psi_t \tag{44}$$

Thus, formulae (42) and (43) can be described as:

$$W^{(k)} \leftarrow W^{(k)} - \lambda \left[ -\frac{1}{N} \sum_{n=1}^{N} \frac{\partial \Psi_n}{\partial W^{(k)}} + \frac{1}{T} \sum_{t=1}^{T} \frac{\partial \Psi_t}{\partial W^{(k)}} \right] \tag{45}$$

$$b^{(k)} \leftarrow b^{(k)} - \lambda \left[ -\frac{1}{N} \sum_{n=1}^{N} \frac{\partial \Psi_n}{\partial b^{(k)}} + \frac{1}{T} \sum_{t=1}^{T} \frac{\partial \Psi_t}{\partial b^{(k)}} \right] \tag{46}$$

The gradients:

$$\frac{\partial \Psi_i}{\partial W^{(k)}}, \frac{\partial \Psi_i}{\partial b^{(k)}}$$

can be calculated as follows using the chain rule of partial differentiation from formula (17).

$$\frac{\partial \Psi_i}{\partial W^{(k)}} = \frac{\partial \Psi_i}{\partial G(x_i)} \frac{\partial G(x_i)}{\partial F(x_i)} \frac{\partial F(x_i)}{\partial W^{(k)}} \quad (47)$$

$$\frac{\partial \Psi_i}{\partial b^{(k)}} = \frac{\partial \Psi_i}{\partial G(x_i)} \frac{\partial G(x_i)}{\partial F(x_i)} \frac{\partial F(x_i)}{\partial b^{(k)}} \quad (48)$$

In a multilayer perceptron, gradients in the form of formulae (47) and (48) can be efficiently calculated by using error back propagation (see Reference Literature 2, for instance).

[Reference Literature 2] Hideki Asoh and seven others, "Deep Learing", the Japanese Society for Artificial Intelligence, Kindai kagaku sha, pp. 5, 2015.

In addition to being executed chronologically in the order described, the processing described for the anomalous sound detection training apparatus or the anomalous sound detection apparatus may also be executed in parallel or individually depending on the processing ability of the apparatus executing the processing or on any necessity.

It goes without saying that other modifications may be made as desired without departing from the scope of this invention.

What is claimed is:

1. An anomalous sound detection training apparatus comprising:
    processing circuitry configured to
        extract an acoustic feature of normal sound based on training data for normal sound by using an acoustic feature extractor;
        update a normal sound model by using the extracted acoustic feature;
        extract an acoustic feature of anomalous sound based on simulated anomalous sound and extract an acoustic feature of normal sound based on the training data for normal sound by using the acoustic feature extractor; and
        update the acoustic feature extractor by using the extracted acoustic feature of anomalous sound and the extracted acoustic feature of normal sound, wherein
    the extraction of the acoustic feature of the normal sound based on the training data, the updating the normal sound model using the extracted acoustic feature, the extraction of the acoustic feature of the anomalous sound and the extraction of the acoustic feature of the normal sound, and the updating the acoustic feature extractor by using the extracted acoustic feature of the anomalous sound and the extracted acoustic feature of the normal sound are repeatedly performed to simultaneously optimize the acoustic feature extractor and the normal sound model, based on a probability density function followed by a feature amount extracted from normal sound and a probability density function followed by a feature amount extracted from anomalous sound, so that a degree-of-anomaly calculated from the feature amount extracted from the normal sound is less than a degree-of-anomaly calculated from the feature amount extracted from the anomalous sound,
    the training data for normal sound is sound signals collected by a microphone installed near or inside a device for which anomalous sound is to be detected, and
    the simultaneous optimization of the acoustic feature extractor and the normal sound model is performed so as to minimize a predetermined objective function L.

2. An anomalous sound detection training apparatus comprising:
    processing circuitry configured to
        extract an acoustic feature of normal sound based on training data for normal sound by using an acoustic feature extractor;
        update a normal sound model by using the extracted acoustic feature;
        extract an acoustic feature of anomalous sound based on training data for anomalous sound and extract an acoustic feature of normal sound based on the training data for normal sound by using the acoustic feature extractor; and
        update the acoustic feature extractor by using the extracted acoustic feature of anomalous sound and the extracted acoustic feature of normal sound, wherein
    the extraction of the acoustic feature of the normal sound based on the training data, the updating the normal sound model using the extracted acoustic feature, the extraction of the acoustic feature of the anomalous sound and the extraction of the acoustic feature of the normal sound, and the updating the acoustic feature extractor by using the extracted acoustic feature of the anomalous sound and the extracted acoustic feature of the normal sound are repeatedly performed to simultaneously optimize the acoustic feature extractor and the normal sound model, based on a probability density function followed by a feature amount extracted from normal sound and a probability density function followed by a feature amount extracted from anomalous sound, so that a degree-of-anomaly calculated from the feature amount extracted from the normal sound is less than a degree-of-anomaly calculated from the feature amount extracted from the anomalous sound,
    the training data for normal sound is sound signals collected by a microphone installed near or inside a device for which anomalous sound is to be detected, and
    the simultaneous optimization of the acoustic feature extractor and the normal sound model is performed so as to minimize a predetermined objective function L.

3. The anomalous sound detection training apparatus according to claim 1, wherein the processing circuitry is further configured to:
    sample the simulated anomalous sound, wherein
    the simulated anomalous sound is anomalous sound simulated by making assumption on one of occurrence frequency, sparsity, and continuity in temporal frequency direction of amplitude values.

4. The anomalous sound detection training apparatus according to claim 3, wherein
    the simulated anomalous sound is $X_{\omega,n}$ as sampled based on a distribution:

$$X_{\omega,n} \sim \frac{1}{\beta} \exp\left\{-\frac{1}{\beta} X_{\omega,n}\right\} \quad (26)$$

where ω is frequency, n is frame number, and β is an integer.

5. An anomalous sound detection training method comprising:
extracting an acoustic feature of normal sound based on training data for normal sound by using an acoustic feature extractor;
updating a normal sound model by using the extracted acoustic feature;
extracting an acoustic feature of anomalous sound based on simulated anomalous sound and extracting an acoustic feature of normal sound based on the training data for normal sound by using the acoustic feature extractor; and
updating the acoustic feature extractor by using the extracted acoustic feature of anomalous sound and the extracted acoustic feature of normal sound, wherein
the extracting the acoustic feature of the normal sound based on the training data, the updating the normal sound model using the extracted acoustic feature, the extracting the acoustic feature of the anomalous sound and the extracting of the acoustic feature of the normal sound, and the updating the acoustic feature extractor by using the extracted acoustic feature of the anomalous sound and the extracted acoustic feature of the normal sound are repeatedly performed to simultaneously optimize the acoustic feature extractor and the normal sound model, based on a probability density function followed by a feature amount extracted from normal sound and a probability density function followed by a feature amount extracted from anomalous sound, so that a degree-of-anomaly calculated from the feature amount extracted from the normal sound is less than a degree-of-anomaly calculated from the feature amount extracted from the anomalous sound,
the training data for normal sound is sound signals collected by a microphone installed near or inside a device for which anomalous sound is to be detected, and
the simultaneous optimization of the acoustic feature extractor and the normal sound model is performed so as to minimize a predetermined objective function L.

6. An anomalous sound detection training method comprising:
extracting an acoustic feature of normal sound based on training data for normal sound by using an acoustic feature extractor;
updating a normal sound model by using the extracted acoustic feature;
extracting an acoustic feature of anomalous sound based on training data for anomalous sound and extracting an acoustic feature of normal sound based on the training data for normal sound by using the acoustic feature extractor; and
updating the acoustic feature extractor by using the extracted acoustic feature of anomalous sound and the extracted acoustic feature of normal sound, wherein
the extracting the acoustic feature of the normal sound based on the training data, the updating the normal sound model using the extracted acoustic feature, the extracting the acoustic feature of the anomalous sound and the extracting of the acoustic feature of the normal sound, and the updating the acoustic feature extractor by using the extracted acoustic feature of the anomalous sound and the extracted acoustic feature of the normal sound are repeatedly performed to simultaneously optimize the acoustic feature extractor and the normal sound model, based on a probability density function followed by a feature amount extracted from normal sound and a probability density function followed by a feature amount extracted from anomalous sound, so that a degree-of-anomaly calculated from the feature amount extracted from the normal sound is less than a degree-of-anomaly calculated from the feature amount extracted from the anomalous sound,
the training data for normal sound is sound signals collected by a microphone installed near or inside a device for which anomalous sound is to be detected, and
the simultaneous optimization of the acoustic feature extractor and the normal sound model is performed so as to minimize a predetermined objective function L.

7. A non-transitory computer-readable medium storing computer-readable instructions thereon, which, when executed by a computer, cause the computer to function as the apparatus according to claim 1.

8. An anomalous sound detection apparatus which detects whether or not input sound is anomalous sound, the anomalous sound detection apparatus comprising:
processing circuitry configured to
extract an acoustic feature of the input sound based on an acoustic feature extractor, wherein the input sound is sound of a machine acquired through a microphone;
calculate a degree of anomaly from the acoustic feature of the input sound; and
determine whether or not the input sound is anomalous sound based on the degree of anomaly and a threshold, wherein
the acoustic feature extractor is optimized, by relating a probability density function followed by a normal sound to a probability density function followed by an anomalous sound, so that the acoustic feature extractor outputs a degree of anomaly to be determined as anomalous sound based on the threshold in case of normal sound and the acoustic feature extractor outputs a degree of anomaly to be determined as anomalous sound based on the threshold in case of the anomalous sound, wherein
the probability density function followed by the normal sound is obtained from a first number of normal sound data,
a probability distribution of the degree of anomaly followed by the anomalous sound is obtained from a number of anomalous sound data sampled, the number of anomalous sound data sampled being substantially same as the first number of normal sound data, and
the determination that the input sound is anomalous sound indicates a potential failure in the machine.

9. The anomalous sound detection apparatus according to claim 8, wherein
the anomalous sound data is generated by an anomalous sound sampling apparatus configured to generate an anomalous sound data where an amplitude spectrum of the anomalous sound data is based on normal sound, differs for each of anomalous sound data, is derived to be sparse and is smoothed in a temporal frequency direction, and an average spectrum of stationary noise is added to the amplitude spectrum of the anomalous sound data.

10. The anomalous sound detection training apparatus according to claim 1, wherein an optimized acoustic feature extractor is used in the extraction of the acoustic feature of the normal sound based on the training data and used in the extraction of the acoustic feature of the anomalous sound.

11. The anomalous sound detection training apparatus according to claim 2, wherein an optimized acoustic feature extractor is used in the extraction of the acoustic feature of the normal sound based on the training data and used in the extraction of the acoustic feature of the anomalous sound.

12. The anomalous sound detection training apparatus according claim 1, wherein the predetermined objective function L is given by $$L=-\int \sigma\{g(A,x)-\phi\}(p(F(A,x)|z=1)-p(F(A,x)|z=0))dx$$

where $$\sigma\{\alpha\} = \frac{1}{1+\exp(-\alpha)},$$

$g(A,x)$ is a degree of anomaly, $\phi$ is a threshold value, $p(F(A,x)|z=1)$ is an anomalous sound model, and $p(F(A,x)|z=0)$ is a normal sound model, and simultaneous optimization of the normal sound model and the acoustic feature extractor is performed so as to simultaneously satisfy both:

$$p(F(A,x)|z=0) = \underset{p(F(A,x)|z=0)}{\operatorname{argmin}} L$$
$$A = \underset{A}{\operatorname{argmin}} L$$

where matrix A is a matrix of values that is used as a multiplier in the acoustic feature extractor.

* * * * *